(12) United States Patent
Chen et al.

(10) Patent No.: US 7,893,634 B2
(45) Date of Patent: Feb. 22, 2011

(54) WIRELESS MANUAL PULSE GENERATOR

(75) Inventors: Fei-Hsu Chen, Taipei Hsien (TW);
Jhy-Hau Chiu, Taipei Hsien (TW)

(73) Assignee: Foxnum Technology Co., Ltd., Tucheng, Taipei County (TW)

( * ) Notice: Subject to any disclaimer, the term of this patent is extended or adjusted under 35 U.S.C. 154(b) by 448 days.

(21) Appl. No.: 12/116,209

(22) Filed: May 7, 2008

(65) Prior Publication Data
US 2009/0185516 A1    Jul. 23, 2009

(30) Foreign Application Priority Data
Jan. 21, 2008    (CN) .................... 2008 1 0300171

(51) Int. Cl.
*H04B 7/00* (2006.01)
*G05B 19/18* (2006.01)

(52) U.S. Cl. .......................... 318/16; 318/575

(58) Field of Classification Search .............. 318/16, 318/569, 575, 600, 605
See application file for complete search history.

(56) References Cited

U.S. PATENT DOCUMENTS

| 4,380,796 | A | * | 4/1983 | Ostby | 700/169 |
| 4,531,182 | A | * | 7/1985 | Hyatt | 700/2 |
| 6,445,959 | B1 | * | 9/2002 | Poth | 700/28 |
| 6,750,780 | B1 | * | 6/2004 | Bitelli | 340/825.69 |

* cited by examiner

*Primary Examiner*—Bentsu Ro
(74) *Attorney, Agent, or Firm*—Frank R. Niranjan

(57) ABSTRACT

The invention relates to a wireless manual pulse generator that includes a central processing unit, a magnification selector, a pulse generator, an axis selector, and a wireless transmission module. The magnification selector is electronically connected to the central processing unit. The pulse generator is electronically connected to the magnification selector. The axis selector is electronically connected to the central processing unit. The wireless transmission module is electronically connected to the central processing unit. The central processing unit is configured to process a signal generated from the magnification selector or the axis selector. The wireless transmission module is configured to deliver the signal processed by the central processing unit to a CNC machine via wireless communication.

7 Claims, 7 Drawing Sheets

WIRELESS MANUAL PULSE GENERATOR

BACKGROUND

1. Field of the Invention

The invention generally relates to manual pulse generators, and particularly to a manual pulse generator with a wireless transmission module.

2. Description of Related Art

Manual pulse generator is a device normally associated with a computer numerically controlled or a CNC machinery or other devices involved in positioning. The manual pulse generator generates electrical pulses that are sent to an equipment controller. The controller will then move the piece of equipment a predetermined distance for each pulse. A cable is needed to connect the manual pulse generator to a controller of the CNC machine. The cable must be moved as an operator operating the manual pulse generator moves. Namely, since the cable must be moved, the operation efficiency is greatly lowered.

Thus, what is needed is manual pulse generator that will increase the freedom of the operator to move about.

SUMMARY

An exemplary wireless manual pulse generator includes a central processing unit, a magnification selector, a pulse generator, an axis selector, and a wireless transmission module. The magnification selector is electronically connected to the central processing unit. The pulse generator is electronically connected to the magnification selector. The axis selector is electronically connected to the central processing unit. The wireless transmission module is electronically connected to the central processing unit. The central processing unit is configured to process a signal generated from the magnification selector or the axis selector. The wireless transmission module is configured to deliver the signal processed by the central processing unit to a CNC machine via wireless communication.

Other advantages and novel features of the present invention will become more apparent from the following detailed description of preferred embodiments when taken in conjunction with the accompanying drawings.

DETAILED DESCRIPTION OF THE EMBODIMENTS

Figure 1:
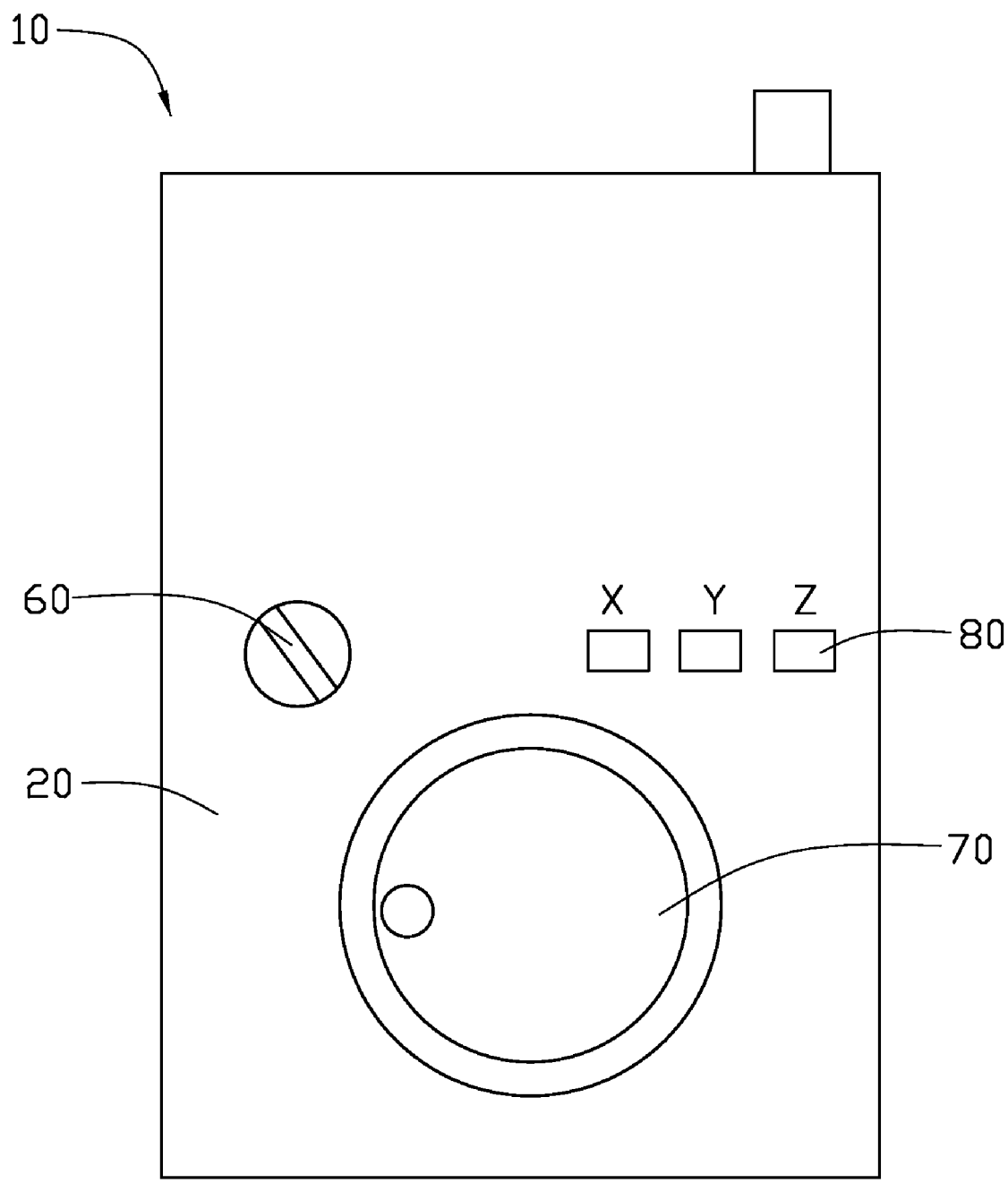
FIG. 1 is a schematic view of a wireless manual pulse generator in accordance with a first embodiment of the present invention.
Figure 2:
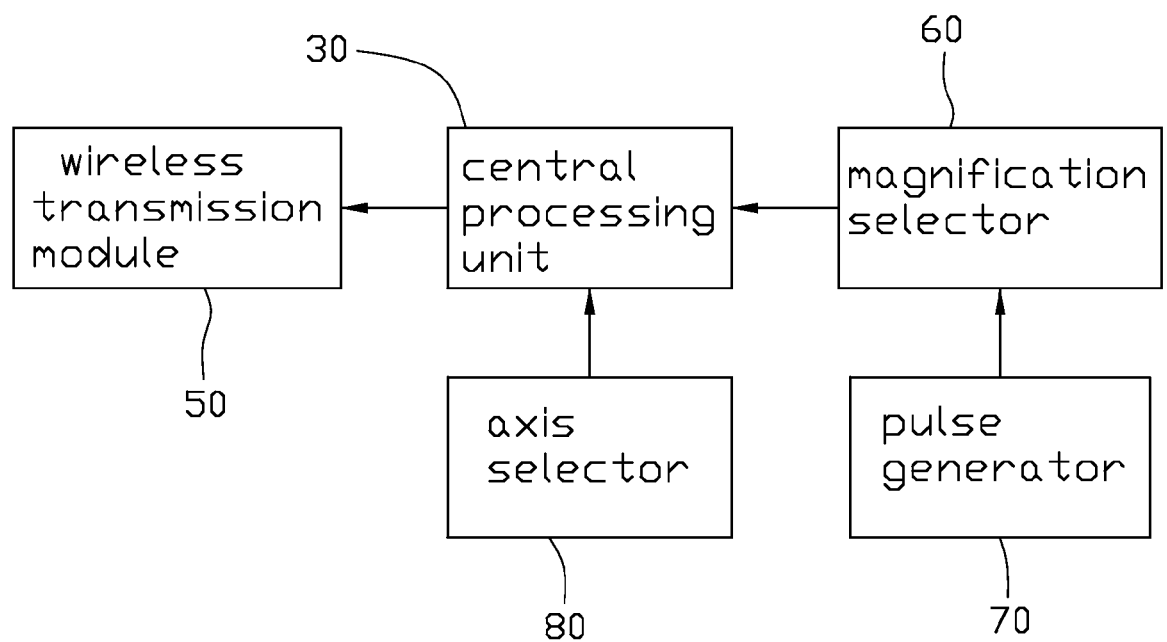
FIG. 2 is a block diagram of the wireless manual pulse generator of FIG. 1.

Referring to FIG. 1 and FIG. 2, a wireless manual pulse generator 10 in accordance with a first embodiment of the present invention includes a main body 20, a central processing unit (CPU) 30, a wireless transmission module 50, a magnification selector 60, a pulse generator 70, and an axis selector 80.

The main body 20 is substantially rectangular shaped, and can be held by a user when in use. The CPU 30 is mounted within the main body 20.

Figure 3:
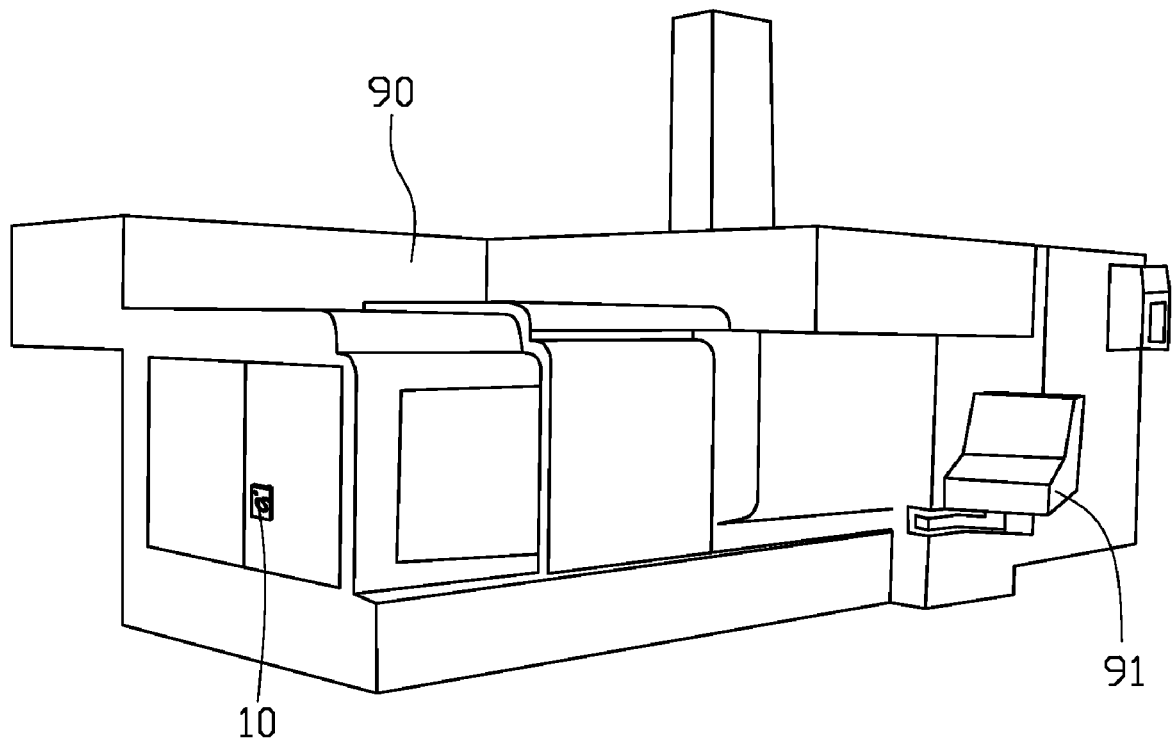
FIG. 3 is a schematic view of the wireless manual pulse generator of FIG. 1 in use together with a CNC machine.

The wireless transmission module 50 is mounted within the main body 20 and is electronically connected to the CPU 30. Referring to FIG. 3, the wireless transmission module 50 is configured to deliver signal or data generated by the CPU 30 to a controller 91 of a CNC machine 90.

The magnification selector 60, the pulse generator 70, and the axis selector 80 are disposed on an upper surface of the main body 20.

The pulse generator 70 is connected to the magnification selector 60, and it is configured to generate a pulse signal. The magnification selector 60 is connected to the CPU 30. The pulse signal generated by the pulse generator 70 is magnified by the number of times equal to a magnification value selected by the magnification selector 60, and it is transmitted to the CPU 30. The axis selector 80 is electronically connected to the CPU 30, and it is configured to choose a drive axis in the CNC machine 90 to be controlled by the wireless manual pulse generator 10. The central process unit 30 transmits data that is generated according to the magnified pulse signal and the selected axis to the CNC machine 90 via the wireless transmission module 50.

In practice, the data output from the wireless manual pulse generator 10 is transferred to the controller 91 of the CNC machine 90 through wireless communication. When a user is operating the wireless manual pulse generator 10 to control the CNC machine 90, the user can move to any observation position with no limitation. Moreover, one wireless manual pulse generator 10 may control many CNC machines 90 by using a same wireless communication protocol. A wireless manual pulse generator 10 may also be connected to a central computer and/or a control station and be controlled by persons or computers not in proximity to the CNC machines 90.

Figure 4:
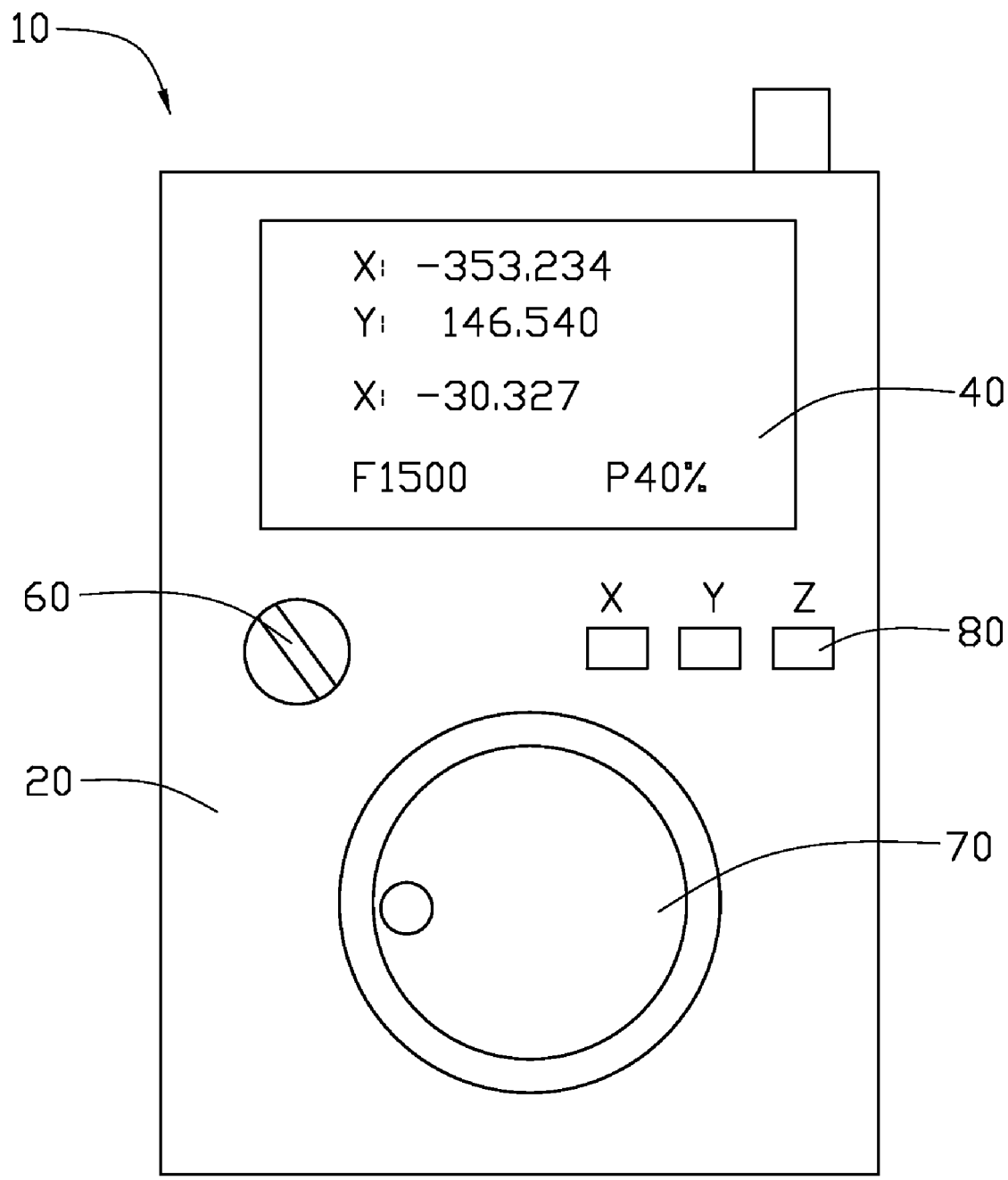
FIG. 4 is a schematic view of a wireless manual pulse generator in accordance with a second embodiment of the present invention.
Figure 5:
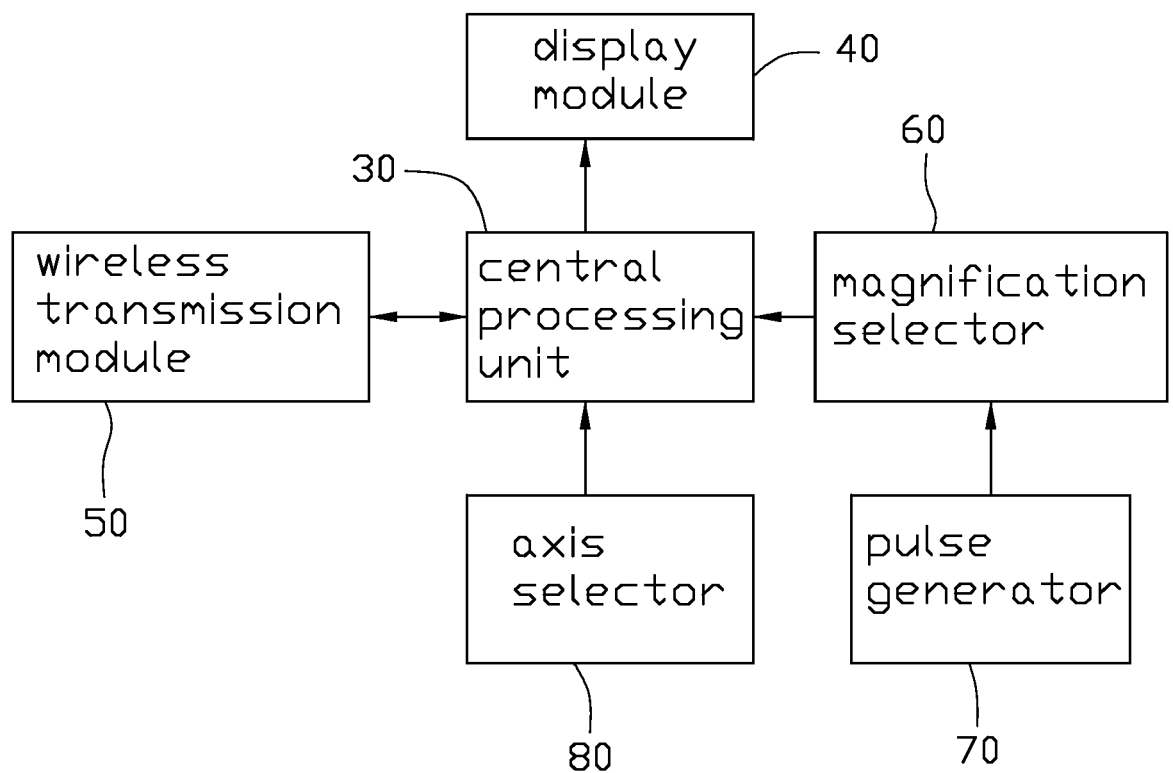
FIG. 5 is a block diagram of the wireless manual pulse generator of FIG. 4.

FIG. 4 and FIG. 5 illustrate a wireless manual pulse generator 10 of a second embodiment of the present invention. In this embodiment, the wireless manual pulse generator device 10 further includes a display module 40, which is mounted on the upper surface of the main body 20 and is electronically connected to the CPU 30. The controller 91 of the CNC machine 90 sends data to the wireless transmission module 50. The wireless transmission module 50 is configured to receive the data from the controller 91. The CPU 30 delivers the data to the display module 40 such that it is displayed to the user.

The user is able to hold the wireless manual pulse generator 10 at an observation position and be shown the manufacturing data of the CNC machine 90 on the display module 40.

Figure 6:
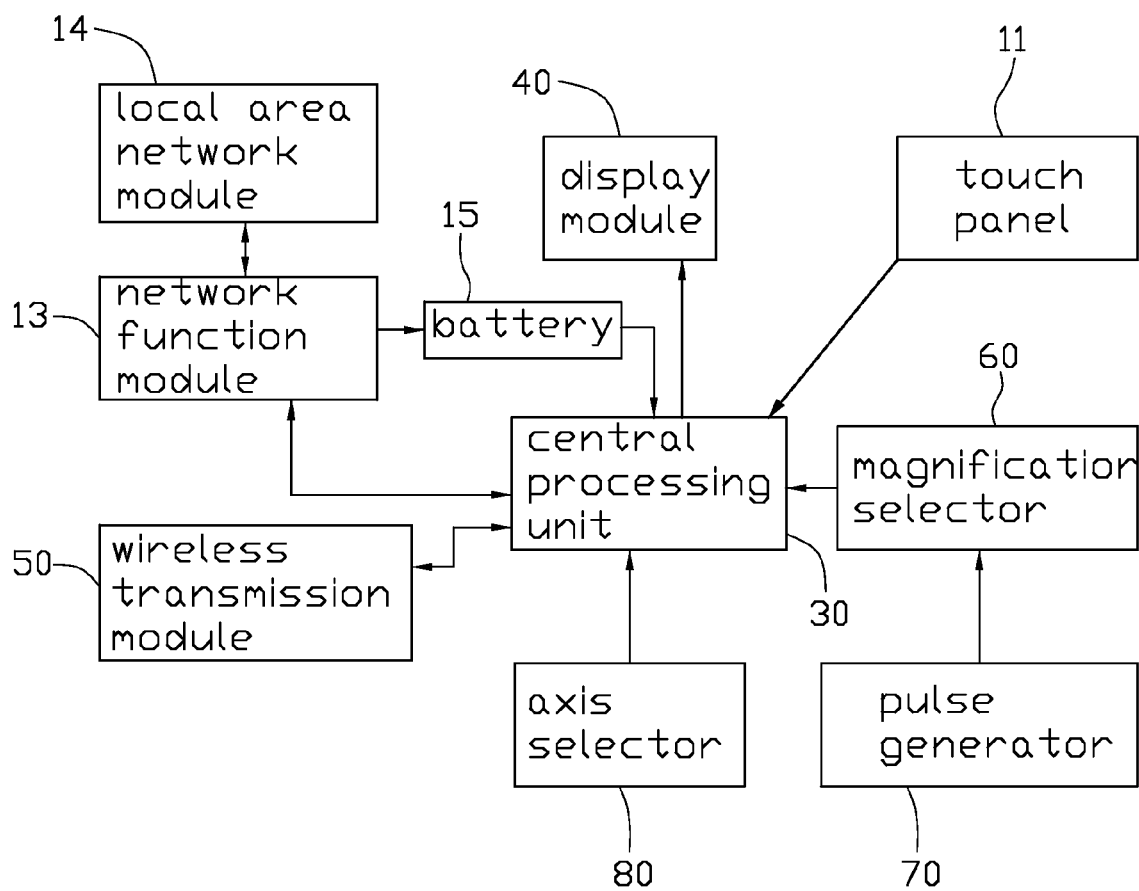
FIG. 6 is a block diagram of a wireless manual pulse generator in accordance with a third embodiment of the present invention.
Figure 7:
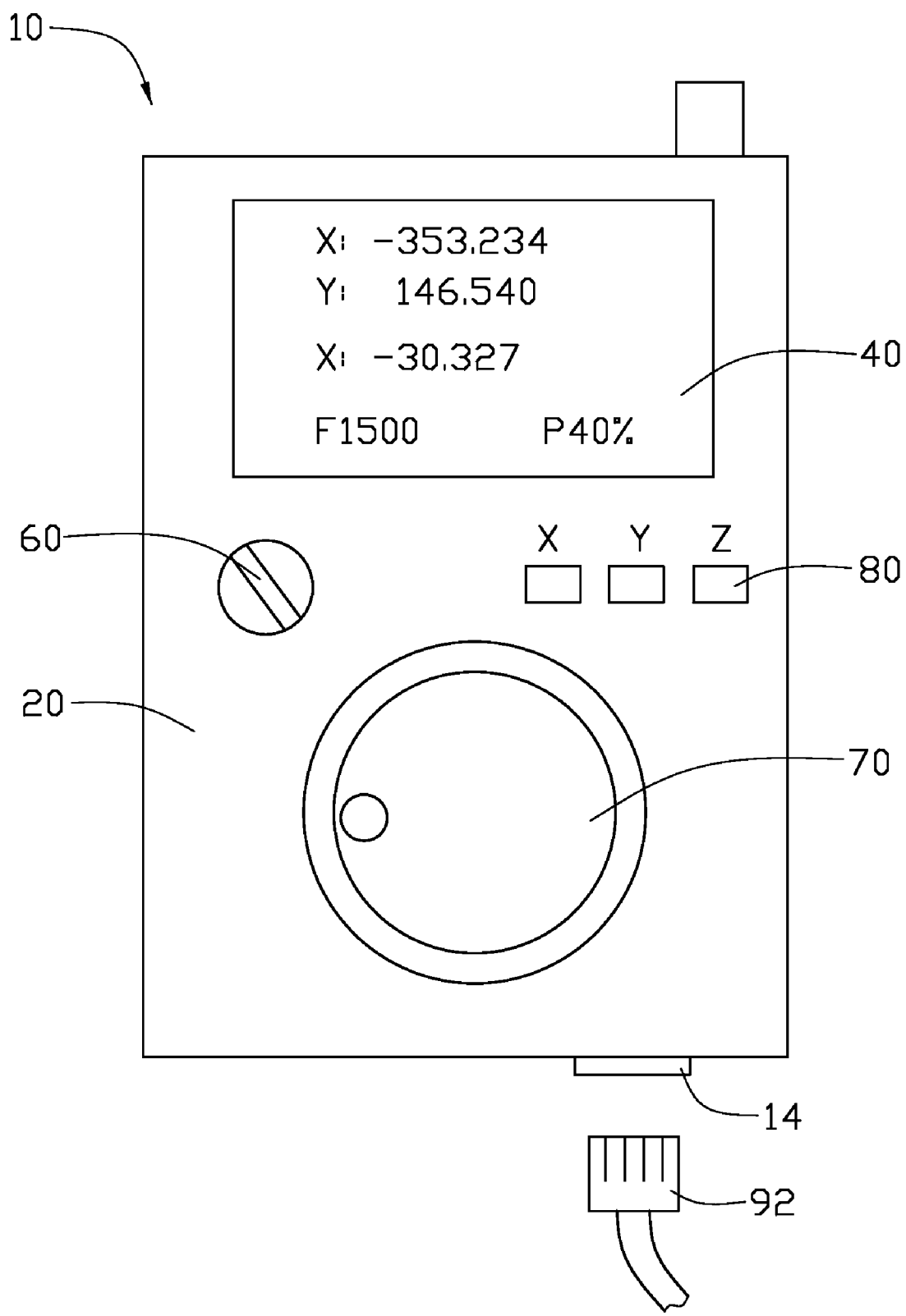
FIG. 7 is a schematic view of the wireless manual pulse generator of FIG. 6.

FIG. 6 and FIG. 7 illustrate a wireless manual pulse generator device 10 of a third embodiment of the present invention. In this embodiment, the wireless manual pulse generator device 10 further includes a touch panel 11, a network function module 13, a local area network module 14, and a battery 15. The touch panel 11 is disposed on the upper surface of the main body 20 and is electronically connected to the CPU 30. Data generated by the touch panel 11 is received and processed by the CPU 30 and is shown on the display module 40. The network function module 13 is mounted in the main body 20 and is electronically connected to the CPU 30. The local area network module 14 is disposed at a bottom of the main body 20 and is electronically connected to the network function module 13. The local area network module 14 is configured to connect to a local area network cable and/or a power cable 92. When the local area network cable is connected to the local area network module 14, the CPU 30 transmits data to the CNC machine 90 via the local area network cable rather than the wireless transmission module 50. The battery 15 is electronically connected to the CPU 30 and the network function module 13, when the power cable is connected to the local area network module 14, the network function module 13 charges the battery 15 of the wireless manual pulse generator 10. The manual pulse generator device 10 is also able to draw power from the local area network cable so that the network cable is able to act as both a network cable and a power cable.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A wireless manual pulse generator, comprising:
    a central processing unit (CPU);
    a magnification selector electronically connected to the CPU;
    a pulse generator electronically connected to the magnification selector;
    an axis selector electronically connected to the CPU; and
    a wireless transmission module electronically connected to the CPU;
    wherein the CPU is configured to process a signal generated from the magnification selector and the axis selector, and the wireless transmission module is configured to deliver the signal generated from the CPU to a CNC machine.

2. The wireless manual pulse generator as claimed in claim 1, further comprising a display module electronically connected to the CPU; the wireless transmission module being configured to receive data from a controller of the CNC machine; and wherein the CPU is capable of sending data to the display module for display.

3. The wireless manual pulse generator as claimed in claim 2, further comprising a touch panel electronically connected to the CPU and the display module, and wherein the touch panel is capable of receiving and sending data to the CPU.

4. The wireless manual pulse generator as claimed in claim 1, further comprising:
    a network function module electronically connected to the CPU; and
    a local area network module electronically connected to the network function module, the local area network module being configured to connect to a cable, wherein the network function module is capable of communicating data between the CPU and the local area network module when the cable is connected to the local area network module.

5. The wireless manual pulse generator as claimed in claim 4, further comprising:
    a battery electronically connected to the CPU and the network function module, wherein the network function module is capable of charging the battery when the power cable is connected to the local area network module.

6. The wireless manual pulse generator as claimed in claim 4, wherein the cable is a power cable.

7. The wireless manual pulse generator as claimed in claim 4, wherein the cable serves as both power supply and network connection.

* * * * *